US007640274B2

(12) United States Patent
Tinker et al.

(10) Patent No.: US 7,640,274 B2
(45) Date of Patent: Dec. 29, 2009

(54) DISTRIBUTED STORAGE ARCHITECTURE BASED ON BLOCK MAP CACHING AND VFS STACKABLE FILE SYSTEM MODULES

(76) Inventors: Jeffrey L. Tinker, 14913 73rd Ave., NE., Kenmore, WA (US) 98028; Peter Lee, 16468 SE. 31st St., Bellevue, WA (US) 98008

( * ) Notice: Subject to any disclaimer, the term of this patent is extended or adjusted under 35 U.S.C. 154(b) by 546 days.

(21) Appl. No.: 11/186,300

(22) Filed: Jul. 20, 2005

(65) Prior Publication Data
US 2006/0064536 A1    Mar. 23, 2006

Related U.S. Application Data

(60) Provisional application No. 60/589,578, filed on Jul. 21, 2004, provisional application No. 60/590,431, filed on Jul. 23, 2004.

(51) Int. Cl.
*G06F 17/00* (2006.01)
(52) U.S. Cl. ............ 707/201; 707/104.1; 707/204; 707/205; 707/101; 711/6; 711/162; 711/141; 711/149; 711/150
(58) Field of Classification Search ............ None
See application file for complete search history.

(56) References Cited

U.S. PATENT DOCUMENTS

| | | | |
|---|---|---|---|
| 4,731,783 A | 3/1988 | Fontanes et al. | 370/321 |
| 5,367,636 A | 11/1994 | Colley et al. | 395/200 |
| 5,375,233 A | 12/1994 | Kimber et al. | 707/205 |
| 5,515,379 A | 5/1996 | Crisler et al. | 370/347 |
| 5,566,174 A | 10/1996 | Sato et al. | 370/468 |
| 5,638,516 A | 6/1997 | Duzett et al. | 395/200.15 |
| 5,768,598 A | 6/1998 | Marisetty et al. | 395/733 |
| 5,781,227 A | 7/1998 | Goode et al. | 348/7 |
| 5,805,804 A | 9/1998 | Laursen et al. | 395/200.02 |

(Continued)

FOREIGN PATENT DOCUMENTS

EP    0 781 002 A2    6/1997

(Continued)

OTHER PUBLICATIONS

A High-Throughput Digital Media Server for Video-on-Demand Service. May 14, 2002 Retrieved online at http://www.csupomona.edu/~ece/eceweb/program/srproject.html.

(Continued)

*Primary Examiner*—Pierre M Vital
*Assistant Examiner*—Mohammad S Rostami
(74) *Attorney, Agent, or Firm*—Woodcock Washburn LLP

(57) ABSTRACT

A distributed storage architecture and tiered caching system are employed in a video-on-demand or streaming media application. An illustrative embodiment of a distributed storage architecture, based on block map caching and virtual file system stackable file system modules, includes a controller, a first computer and a second computer, first and second switches, and a storage device. The first computer includes a local file system and uses this to store asset files in the local file system on the first storage device. The first computer employs a process to create a block map for each asset file, the block map including information concerning boundaries where an asset file is stored on the first storage device.

37 Claims, 7 Drawing Sheets

U.S. PATENT DOCUMENTS

| | | | |
|---|---|---|---|
| 5,854,924 A * | 12/1998 | Rickel et al. | 717/132 |
| 5,966,162 A | 10/1999 | Goode et al. | 348/10 |
| 6,112,226 A | 8/2000 | Weaver et al. | 709/203 |
| 6,119,154 A | 9/2000 | Weaver et al. | 709/219 |
| 6,128,717 A * | 10/2000 | Harrison et al. | 711/202 |
| 6,138,147 A | 10/2000 | Weaver et al. | 709/206 |
| 6,148,414 A | 11/2000 | Brown et al. | 714/9 |
| 6,157,051 A | 12/2000 | Allsup et al. | 257/207 |
| 6,166,730 A | 12/2000 | Goode et al. | 345/327 |
| 6,182,206 B1 | 1/2001 | Baxter | 712/43 |
| 6,208,335 B1 | 3/2001 | Gordon et al. | 345/327 |
| 6,233,607 B1 | 5/2001 | Taylor et al. | 709/217 |
| 6,253,271 B1 * | 6/2001 | Ram et al. | 710/306 |
| 6,289,376 B1 | 9/2001 | Taylor et al. | 709/219 |
| 6,301,605 B1 * | 10/2001 | Napolitano et al. | 709/201 |
| 6,314,572 B1 | 11/2001 | LaRocca et al. | 725/60 |
| 6,314,573 B1 | 11/2001 | Gordon et al. | 725/61 |
| 6,499,039 B1 * | 12/2002 | Venkatesh et al. | 707/204 |
| 6,535,557 B1 | 3/2003 | Saito et al. | 375/240.1 |
| 6,618,363 B1 | 9/2003 | Bahl | 370/329 |
| 6,745,284 B1 * | 6/2004 | Lee et al. | 711/114 |
| 6,816,891 B1 * | 11/2004 | Vahalia et al. | 709/214 |
| 6,898,681 B2 * | 5/2005 | Young | 711/162 |
| 6,950,915 B2 * | 9/2005 | Ohno et al. | 711/162 |
| 6,986,019 B1 * | 1/2006 | Bagashev et al. | 711/217 |
| 7,051,176 B2 * | 5/2006 | Meiri et al. | 711/163 |
| 7,058,721 B1 * | 6/2006 | Ellison et al. | 709/231 |
| 7,096,481 B1 * | 8/2006 | Forecast et al. | 725/32 |
| 7,197,516 B1 * | 3/2007 | Hipp et al. | 707/200 |
| 7,233,946 B1 * | 6/2007 | McPolin | 707/8 |
| 7,305,529 B1 * | 12/2007 | Kekre et al. | 711/162 |
| 7,318,190 B2 * | 1/2008 | Edirisooriya | 714/800 |
| 2001/0001870 A1 * | 5/2001 | Ofek et al. | 711/112 |
| 2001/0004767 A1 | 6/2001 | Gordon et al. | 725/87 |
| 2001/0019336 A1 | 9/2001 | Gordon et al. | 345/719 |
| 2001/0034786 A1 * | 10/2001 | Baumeister et al. | 709/231 |
| 2001/0037443 A1 | 11/2001 | Liu | 712/200 |
| 2001/0044851 A1 * | 11/2001 | Rothman et al. | 709/231 |
| 2002/0007417 A1 | 1/2002 | Taylor et al. | 709/231 |
| 2002/0026645 A1 * | 2/2002 | Son et al. | 725/117 |
| 2002/0064177 A1 | 5/2002 | Bertram et al. | 370/458 |
| 2002/0133491 A1 * | 9/2002 | Sim et al. | 707/10 |
| 2002/0156973 A1 * | 10/2002 | Ulrich et al. | 711/114 |
| 2003/0005457 A1 * | 1/2003 | Faibish et al. | 725/94 |
| 2003/0031176 A1 * | 2/2003 | Sim | 370/392 |
| 2003/0077068 A1 | 4/2003 | Lin et al. | 386/68 |
| 2003/0079018 A1 | 4/2003 | Lolayekar et al. | 709/226 |
| 2003/0217082 A1 * | 11/2003 | Kleiman et al. | 707/204 |
| 2003/0217119 A1 * | 11/2003 | Raman et al. | 709/219 |
| 2003/0221197 A1 | 11/2003 | Fries et al. | 725/117 |
| 2004/0088288 A1 | 5/2004 | Pasupathy et al. | 707/3 |
| 2004/0133570 A1 | 7/2004 | Soltis | 707/3 |
| 2004/0133607 A1 | 7/2004 | Miloushev et al. | 707/200 |
| 2004/0139047 A1 * | 7/2004 | Rechsteiner et al. | 707/1 |
| 2004/0158867 A1 * | 8/2004 | Mack et al. | 725/95 |
| 2005/0055501 A1 * | 3/2005 | Guha et al. | 711/112 |
| 2005/0071393 A1 * | 3/2005 | Ohno et al. | 707/204 |
| 2005/0198451 A1 * | 9/2005 | Kano et al. | 711/162 |
| 2005/0223107 A1 * | 10/2005 | Mine et al. | 709/231 |
| 2006/0010180 A1 * | 1/2006 | Kawamura et al. | 707/204 |
| 2006/0075005 A1 * | 4/2006 | Kano et al. | 707/204 |

FOREIGN PATENT DOCUMENTS

| | | | |
|---|---|---|---|
| WO | 00/04719 | A1 | 1/2000 |
| WO | 00/33567 | A1 | 6/2000 |
| WO | 00/42776 | A1 | 7/2000 |
| WO | 00/45590 | A1 | 8/2000 |
| WO | 00/59202 | A2 | 10/2000 |
| WO | 00/59203 | A2 | 10/2000 |
| WO | 00/59220 | A1 | 10/2000 |
| WO | 00/59228 | A1 | 10/2000 |
| WO | 01/31605 | A1 | 5/2001 |
| WO | 01/43434 | A1 | 6/2001 |
| WO | 01/43438 | A1 | 6/2001 |
| WO | 01/52537 | A1 | 7/2001 |
| WO | 01/55860 | A1 | 8/2001 |
| WO | 01/55877 | A1 | 8/2001 |
| WO | 01/56290 | A1 | 8/2001 |
| WO | 02/45308 | A1 | 6/2002 |
| WO | 2004/034707 | A1 | 4/2004 |

OTHER PUBLICATIONS

FPGA-based MPEG TMultiple-Channel Transport Stream Generator. May 14, 2002 Retrieved online at http://www.csupomona.edu/~ece/eceweb/program/srproject.html.

Altera Corporation, Application Note 132, "Implementing Multiprotocol Label Switching with Altera PLDs," Jan. 2001, ver. 1.0, pp. 1-12.

Baumgartner, J., "Judge upholds jury decision in nCUBE-SeaChange patent spat," *CED Broadband Direct News*, Apr. 13, 2004, retrieved online at: http://www.cedmagazine.com/cedailydirect/2004/0404/cedaily040413.htm 1 page.

Baumgartner, J., "Thirdspace investment insulates Concurrent from VOD patent war," from *CED Broadband Direct*, Jun. 10, 2002, retrieved online at: http://www.broadbandweek.com/news/020610/020610_content_third.htm, 1 page.

Digital Program Insertion (DPI) White Paper, nCUBE, Jun. 13, 2001, 4 pages.

DVB Master Overview, Linear Systems Ltd. May 14, 2002 Retrieved online at: http://www.linsys.ca/products/hardware/dvb.htm, 8 pages.

MCS4 MPEG2 Stream Controller PCI Card: Overview, Copyright © 2002 Norpak Corporation. Retrieved online at: http://www.norpak.ca/TES8.htm, 4 pages.

Product Review: "Amphion Announces Rijndael Encryption Cores" Aug. 8, 2001, retrieved online at : http://www.chipcenter.com/pld/products_600-699/prod627.lhtm, 4 pages.

SiliconServer White Paper. © 2002 BlueArc Corporation, pp. 1-17.

Texas Memory Systems, Inc. Brochure for RAM-SAN™ RamSan-320. Jul. 1, 2003.

Ullmer, C. et al., "Active SANs: Hardware Support for Integrating Computation and Communication," Feb. 2, 2002. 12 pages.

Walko, J., "Agere unveils 3G baseband-processing scheme," *Electronic Engineering Times*, Feb. 16, 2004, p. 37.

Burns, R. et al, "A Bit-Parallel Search Algorithm for Allocating Free Space," *Modeling, Analysis and Simulation of Computer and Telecommunications Systems, Ninth International Symposium*, Aug. 15-18, 2001, 302-310.

Christaldi, R. et al., "The Cluster File System: Integration of High Performance Communication and I/O in Clusters," *IEEE Computer Society, Cluster Computing and the Grid 2nd IEEE/ACM International Symposium*, Berlin, Germany, May 21, 2002, 173-182.

Federighi, C. et al., "A Distributed Hierarchical Storage Manager for a Video-on-Demand System," *Storage and Retrieval for Image and Video Databases (SPIE)*, Feb. 2004, 1-13.

Kleiman, S.R., "Vnodes: An Architecture for Multiple File System Types in Sun UNIX," *USENIX Association: Summer Conference Proceedings*, 1986, 1-10.

Rosenthal, D., "Evolving the Vnode Interface," *USENIX Summer Conference Proceedings*, 1990, 107-117.

Shinkai, Y. et al., "HAMFS File System," *Reliable Distributed Systems, Proceedings of the 18th IEEE Symposium on Lausanne, Switzerland*, Los Alamitos, California, Oct. 19-22, 1999, 190-201.

Federighi, C. et al., "A Distributed Hierarchical Storage Manager for a Video-on-Demand System," *Storage And Retrieval For Image And Video Databases (SPIE)*, Feb. 1994, 1-13.

* cited by examiner

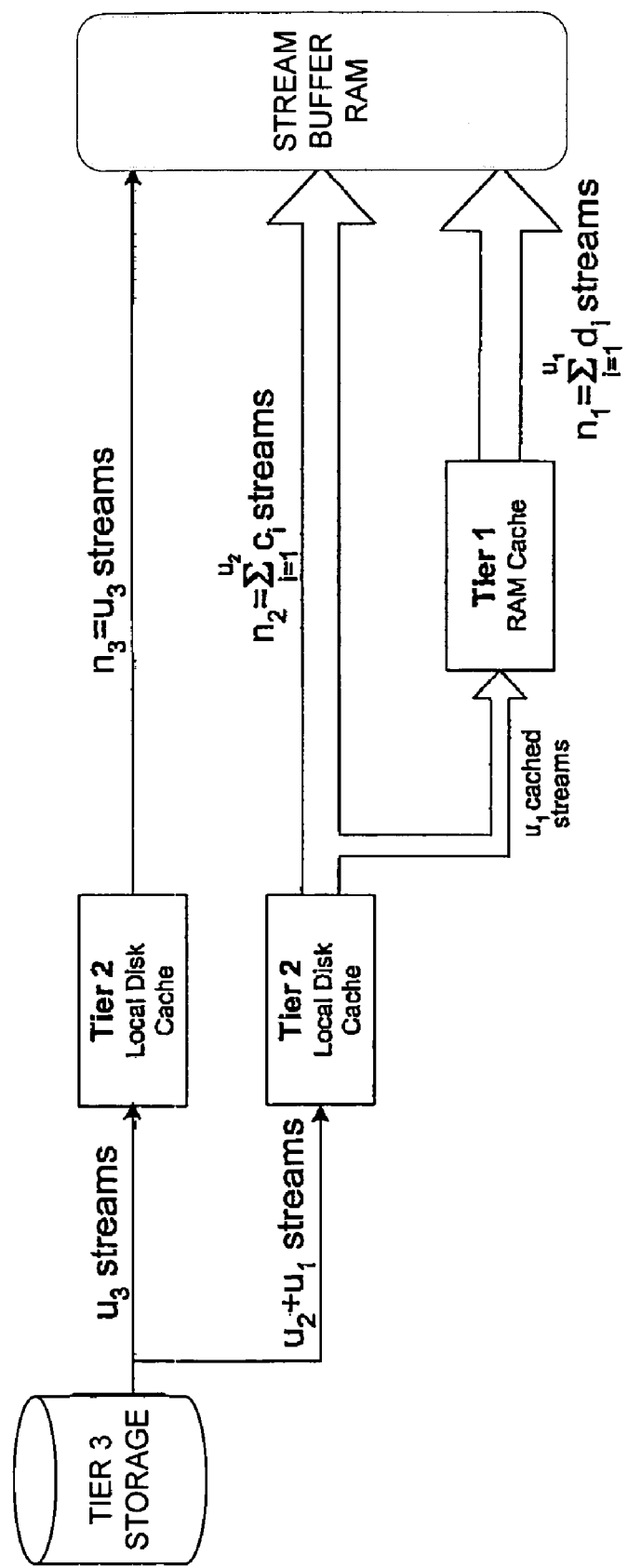
FIGURE 4 (AMPLIFICATION EFFECT OF TIER 1 AND TIER 2 CACHES)

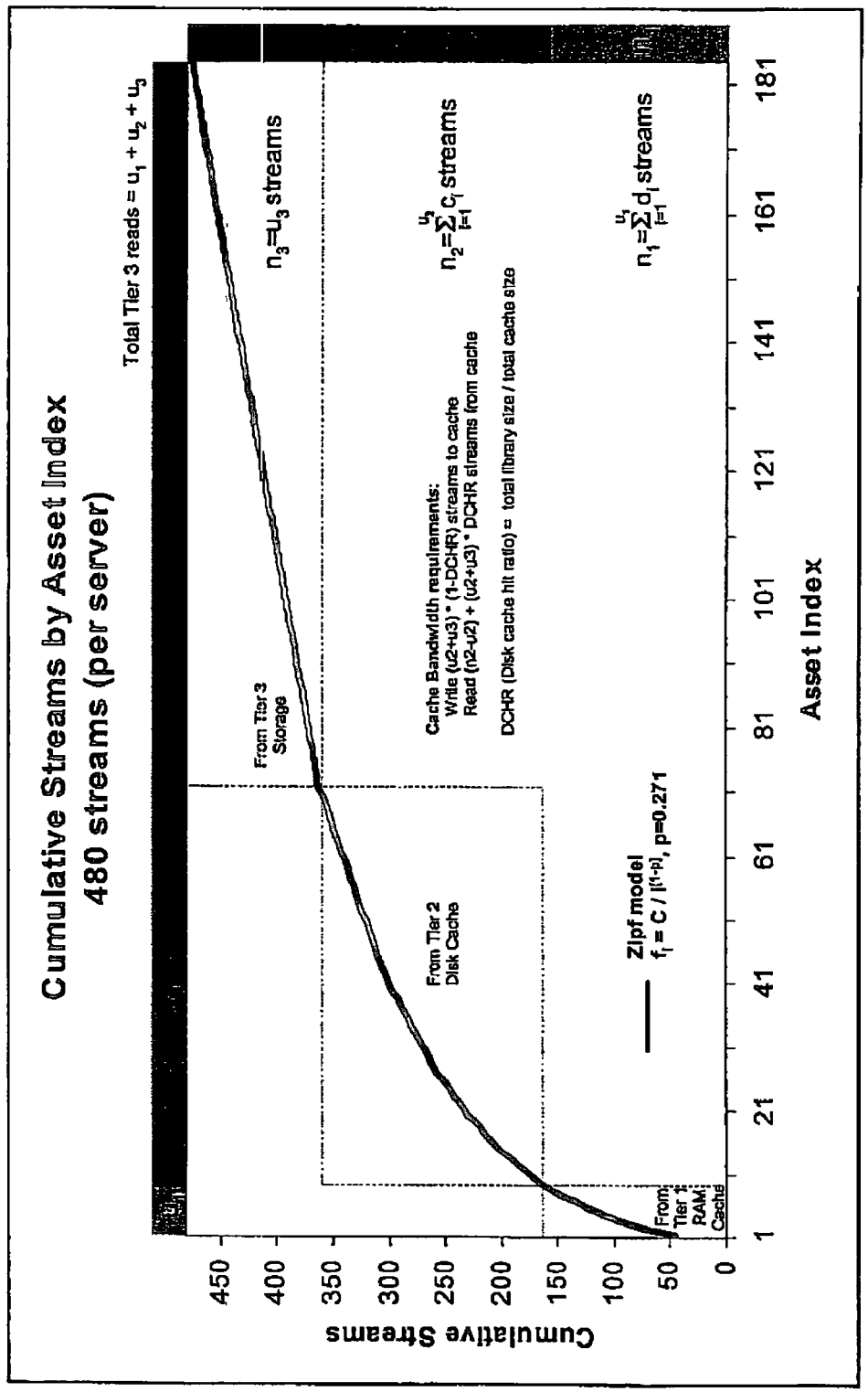
FIGURE 5 (STREAM DIST. ACROSS CACHE TIERS)

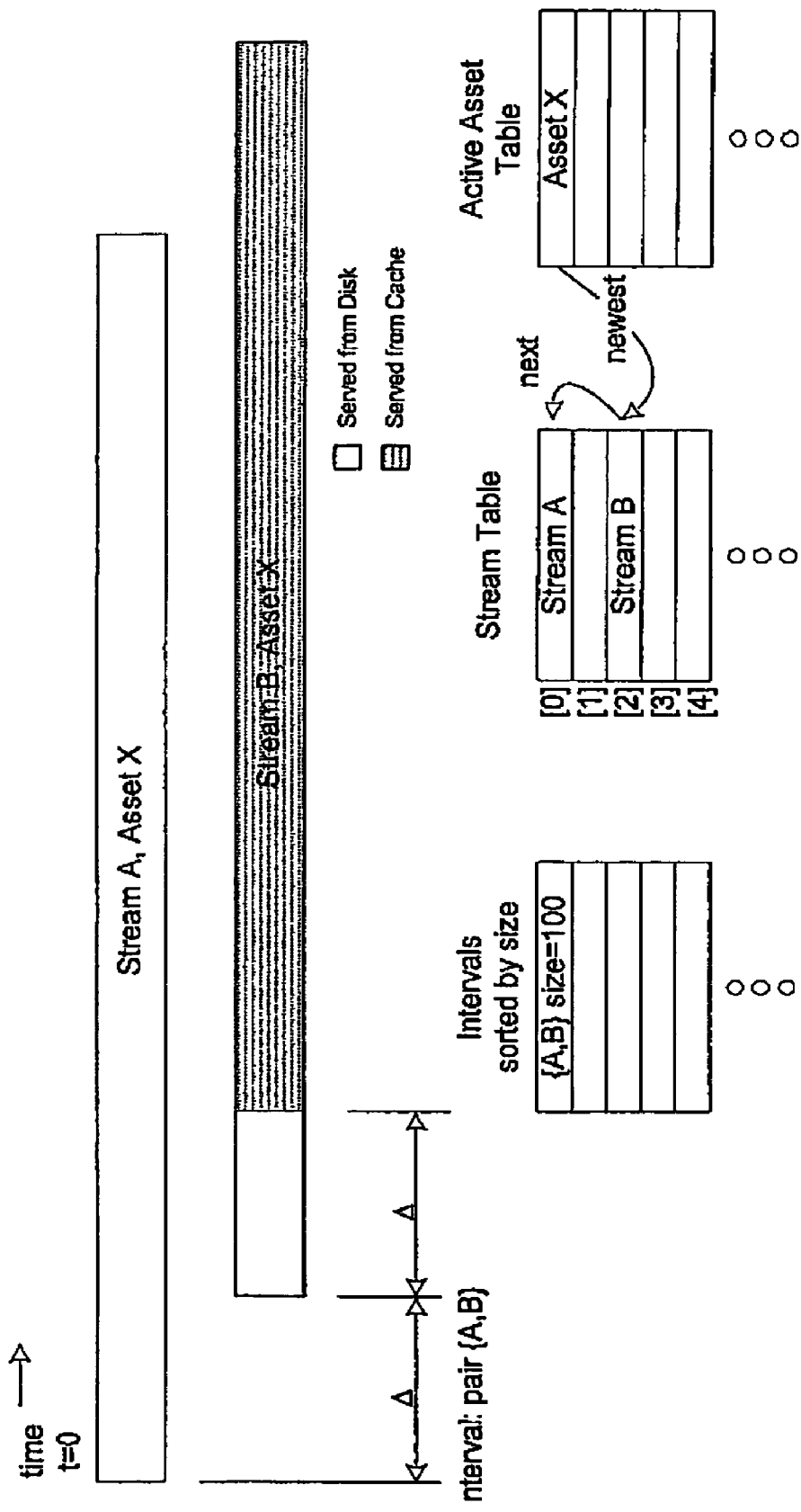
FIGURE 6 (INTERVAL CACHING)

DISTRIBUTED STORAGE ARCHITECTURE BASED ON BLOCK MAP CACHING AND VFS STACKABLE FILE SYSTEM MODULES

CROSS REFERENCE

This application claims the benefit of U.S. Provisional Application Nos. 60/589,578, entitled "Distributed Storage Architecture Based on Block Map Caching and VFS Stackable File System Modules," filed on Jul. 21, 2004, and 60/590,431, entitled "A Scalable Streaming Video Server Complex Based on Tiered Caching," filed on Jul. 23, 2004, each of which is hereby incorporated by reference in its entirety.

TECHNICAL FIELD

The disclosure generally relates to distributed storage systems for distributing data, such as, e.g., streaming video data.

BACKGROUND

Background information relating to the subject matter disclosed herein may be found in the following references:

(1) E. Zadok, et al., "Extending File Systems Using Stackable Templates," in *Proc. 1999 USENIX Annual Technical Conf.*, June 1999;
(2) D. Rosenthal, "Evolving the Vnode Interface," in *Proceedings of the Summer USENIX Conference*, pp. 107-117, June 1990.
(3) A. Dan, et al., "Buffer Management Policy for an On-Demand video server," in *IBM Research Report RC 19347*.
(4) A. Dan, et al., "Buffering and Caching in Large-scale video servers," in *Proc. Compcon*, pp. 217-224, March 1995; and
(5) M. Bar, et al., "Long-term Movie Popularity Models in Video-on-Demand Systems," *Proceedings of ACM Multimedia Conference*, pp. 349-357, November 1997.

BRIEF DESCRIPTION OF THE DRAWINGS

FIG. 4 illustrates an example of an amplification effect of tier 1 and tier 2 caches.

FIG. 5 illustrates an example of stream distribution across cache tiers.

FIG. 6 illustrates an example of interval caching.

DETAILED DESCRIPTION

A shared-storage system for use in a complex of video servers is based on the concept of cached block maps. The system may enable multiple video servers to cooperatively stream assets from a common pool of storage in a server complex while reducing the overhead and complexity of distributed file systems. The system allows a common pool of assets to appear as local files on video servers, and transparently redirect streaming read requests to the storage devices through a storage area network (SAN), e.g., such as a Fibre Channel storage area network (SAN).

In addition, a highly scalable complex of video servers may be based on the concept of tiered caching. The system may enable a multitude of video servers to cooperatively stream assets from a common pool of storage in a distributed complex. The system may allow storage bandwidth, storage capacity and streaming bandwidth to be associated with end user requirements.

According to one embodiment, a distributed storage system for streaming data may include a controller, a first computer and a second computer, first and second switches, and a storage device. The first computer may include a local file system and may use the local file system to store asset files on the first storage device. In addition, the first computer may employ a process to create a block map, including information concerning boundaries where an asset file is stored on the first storage device. A block map may be created for each asset file.

According to another embodiment, a tiered caching system may be employed for streaming digital assets. An exemplary implementation of such a system includes a third tier cache memory that stores the asset, and a plurality of video pumps coupled to the third tier cache. Each video pump may include a second tier cache memory that receives a copy of the asset from the third tier cache memory and emits one or more streams, and a first tier cache memory that receives a copy of the asset from the second tier cache memory and emits a plurality of streams. The system may also include a resource controller that chooses a video pump from the plurality of video pumps to stream the asset.

Figure 1:
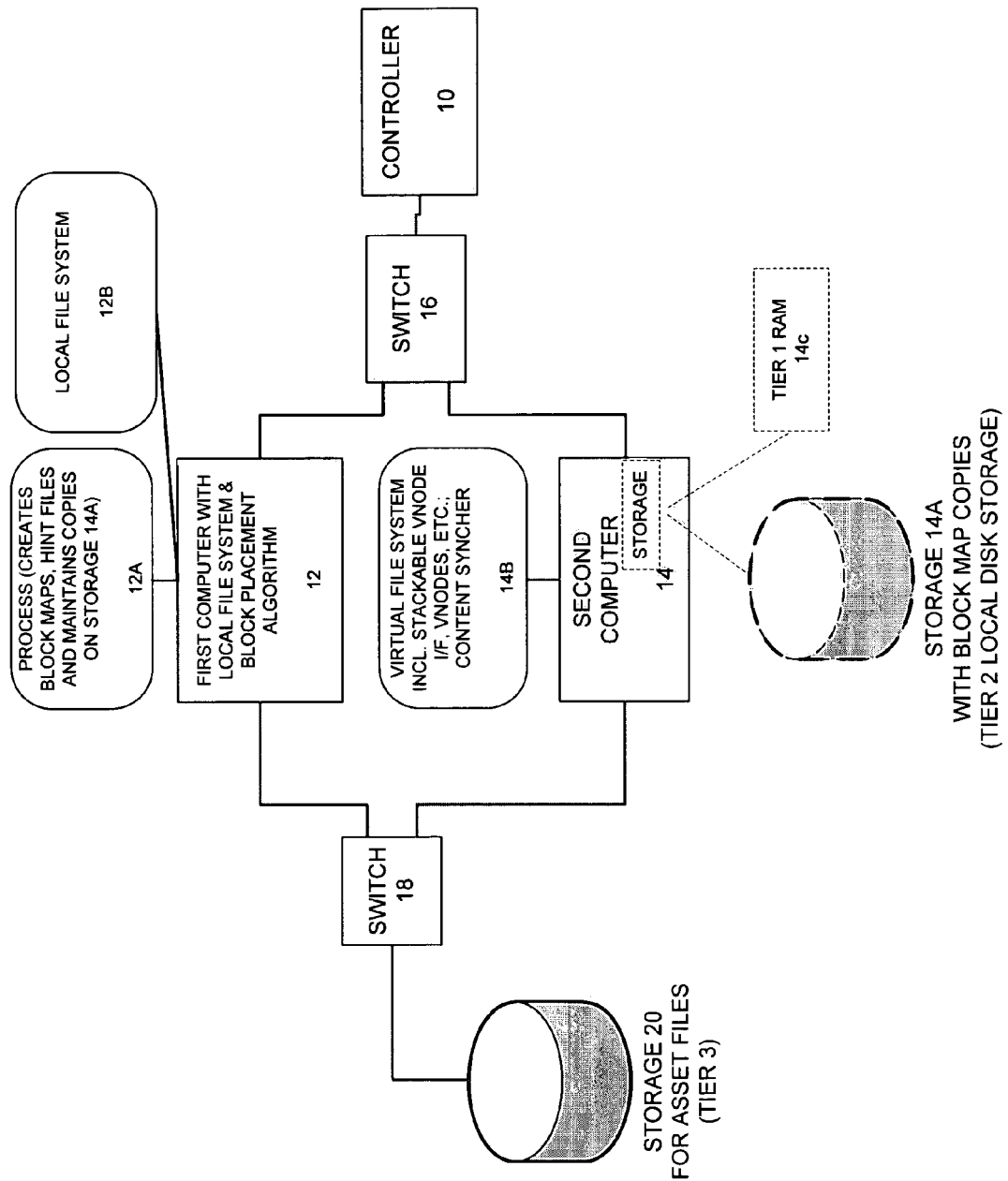
FIG. 1 schematically depicts a distributed storage complex in an embodiment.

FIG. 1 illustrates an embodiment of a distributed storage system that is capable of streaming data. As shown, the system may include a controller 10, a first computer 12 and a second computer 14, first and second switches 16 and 18, and a storage device 20. The first computer 12 may include a local file system 12B that may be used to store asset files in the local file system on the first storage device 20. In addition, the first computer 12 may employ a process 12A to create a block map for each asset file. A block map may include information concerning boundaries where an asset file is stored on the first storage device 20.

The program or process 12A may store a copy of the block map on a second storage device 14A coupled to the second computer 14. As shown, the second computer 14 may be also coupled to the first storage device 20.

In addition, the system may include a virtual file system 14B that enables the second computer 14 to access the asset files on the first storage device 20 using the copies of the block maps stored in storage device 14A.

A block placement algorithm may be employed by the local file system of the first computer 12 and may write multiple local file system blocks contiguously when the first computer stores an asset file. In addition, the switch 18 may provide concurrent, non-blocking access between the first computer 12, the second computer 14, and the storage device 20. The process 12A may create a "hint file" (discussed below) including pointers to locations in the asset file(s).

A method for reading data from a first file stored on a first storage device includes storing a block map in a second file, where the block map may include a list of logical block addresses and each logical block address in the list may identify a sector used to store data in the first file. This method also may include issuing a system call to read data from a virtual file associated with the first file, retrieving a logical block address associated with the data, and reading data from the first storage device using the associated logical block address.

Another aspect of the illustrative system relates to a tiered caching system for streaming digital assets. An exemplary embodiment of such a system may include a third tier cache memory that stores an asset. This could be, e.g., the storage device 20 of FIG. 1. In addition, the exemplary system further may include a one or more video pumps (such as the second computer 14) coupled to the third tier cache memory. Here, a video pump may include a second tier cache memory 14A (second storage device) that receives a copy of the asset from the third tier cache memory and emits one or more streams, a first tier cache memory 14C that receives a copy of the asset from the second tier cache memory and emits a plurality of streams, and a resource controller (such as controller 10) that chooses a video pump from the plurality of video pumps to stream the asset.

Distributed Storage Architecture

Figure 1A:
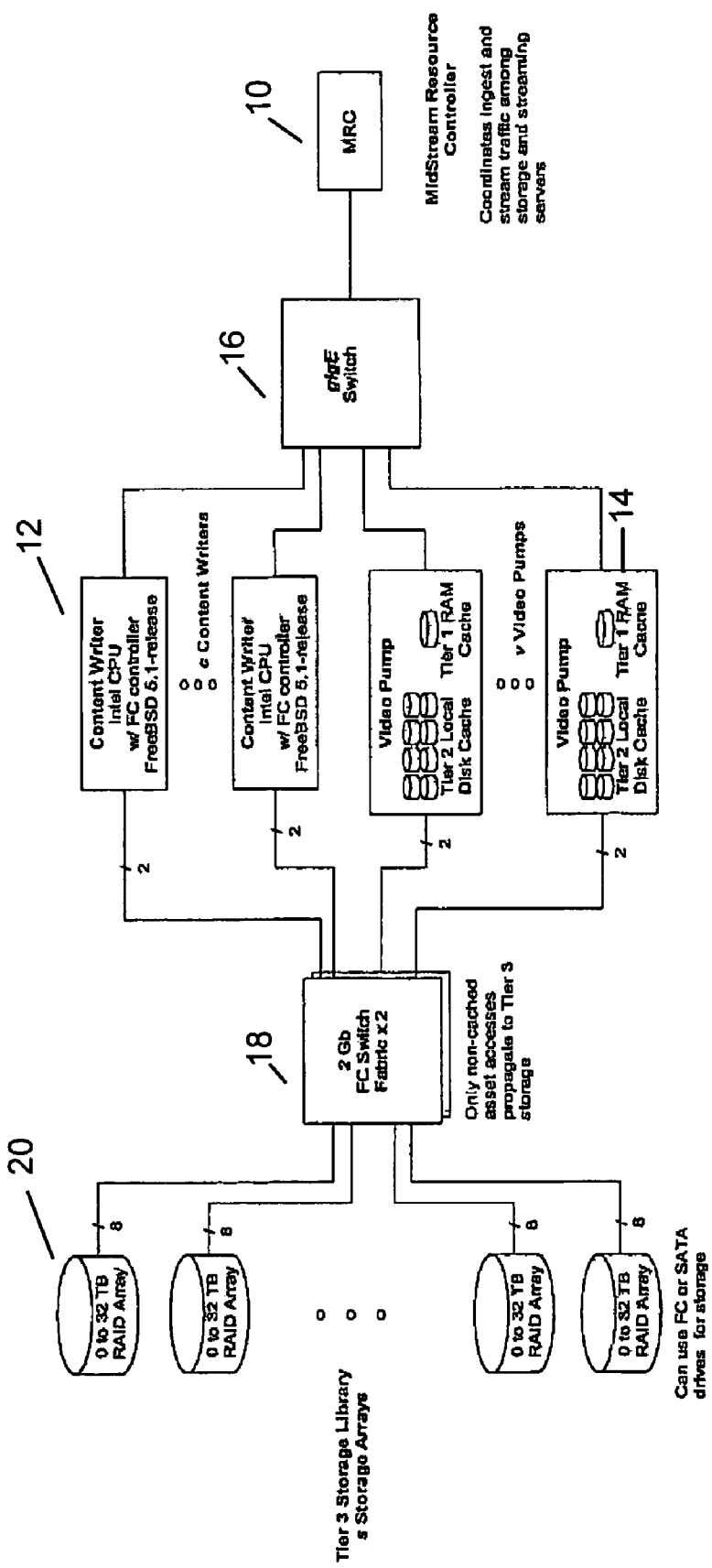
FIG. 1A schematically depicts one multi-server arrangement of the system depicted in FIG. 1.

FIG. 1A depicts an illustrative embodiment of a scalable video-server complex. Such a complex may include a resource controller 10, a number of content writers 12, one or more of which may manage one or more file systems, and a number of video pumps 14. Some or all of the components may be interconnected via Ethernet and Fibre Channel switches 16 and 18. The Fibre Channel switches 18 may provide concurrent non-blocking access between video pumps 14, content writers 12 and the Storage Arrays 20.

A content writer 12 manages one or more file system volumes from external Fibre Channel storage arrays 20. The storage 20 may be mounted on the content writer 12 as a local file system. The system may be configured such that no other component in the complex directly mounts the file system, but the architecture enables video pumps 14 to stream from the storage 20 just as if it was mounted locally on each video pump. One or more of the file systems may include a single LUN (Logical Unit Number) that resides on a RAID storage array.

Ingest, or asset loading, may be performed by the content writers 12. The assets being ingested may be written to the content writer's local file system. The resource controller 10 may direct the distribution of assets across file systems, ensuring that assets are loaded uniformly and randomly across the storage arrays.

The number c of content writers 12 in a complex may be determined by the total ingest capacity required. Since each content writer has a fixed maximum ingest capacity, c is simply the total desired ingest capacity of the complex divided by the capacity of each content writer.

The number of video pumps 14, v, may be determined by the number of streams to be served from the complex and is simply the total number of desired streams divided by the capacity of each video pump.

The number of storage arrays 20, s, may be determined by (1) the maximum storage capacity requirements, (2) the unique, or non-cached, streaming requirements of the complex and/or (3) the bandwidth available from each array. Statistical techniques may be used to determine, with high probability, the maximum percentage of the load that will fall on the most heavily loaded array at any given time.

Block Map Caching

The shared storage architecture enables the video pumps 14 to stream from the content writers' local file systems. It does this using a block map (bmap) caching mechanism that enables the content writers 12 to divulge the locations of asset data blocks to the video pumps 14. The video pumps 14 may then be able to read the data blocks directly via the Fibre Channel switch 18 and stream from them. The block maps for or more asset in the system are cached on a local file system on one or more video pump for the life of the asset. A content syncher process running on each video pump ensures that the block map cache remains consistent with the state of the assets on the content writers 12. Persistently caching the block maps and hint files for assets on the video pump(s) may enable streaming to continue in the event of content writer failure.

A new file system layer called BCFS, the Block map Cache File System, implements the block map-to-asset-data lookup transparently to applications while streaming. In addition to the assets, hint files are required for streaming. The hint files may be generated on the content writers' local storage during the ingestion process. The hint files may be propagated to the video pumps 14 with the bmaps and similarly stored on a local file system for the life of the asset. Alternatively, block maps for the hint files may be propagated to the video pumps 14, which enables the files to be accessed in a similar manner to the assets and requires fewer local storage and network resources, but does introduce additional delays if the hint file data is needed during asset ingestion.

Block Map Cache File System (BCFS)

BCFS may be a thin file system layer that presents a transparent interface to user level applications, enabling them to open and stream from assets on Tier 3 storage as if they were mounted locally.

BCFS is not a file store, meaning that it does not implement any on-disk data structures. It may use an underlying UFS file system to persist all asset block maps and hint files.

BCFS may be based on the concept of a stackable vnode interface (see, E. Zadok, et al., "Extending File Systems Using Stackable Templates," in Proc. 1999 USENIX Annual Technical Conf., June 1999). A virtual node, or vnode, may be a data structure used within the Unix kernel to represent entities such as open files or directories that appear in the file system namespace. A vnode may be independent of the physical characteristics of the underlying operating system. The vnode interface provides a uniform way for higher level kernel modules to perform operations on vnodes. The virtual file system (VFS) implements common file system code that may include the vnode interface.

The vnode interface supports a concept known as stacking, in which file system functions may be modularized by allowing one vnode interface implementation to call another. Vnode stacking allows multiple file system implementations to exist and call each other in sequence. In a stackable vnode implementation, an operation at a given level of the stack may invoke the same operation at the next lower level in the stack.

Figure 2:
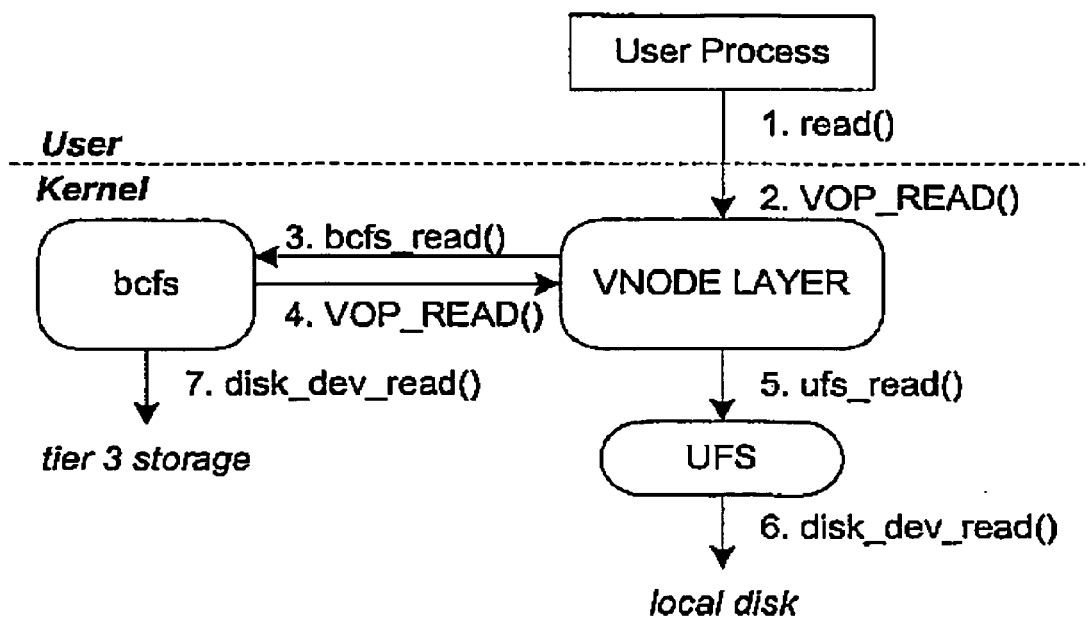
FIG. 2 illustrates an example of a block cache file system (BCFS) read operation.

FIG. 2 shows how a user read( ) call may be translated into a VFS read operation that may be handled by BCFS. Steps 1-3 represent the user process issuing the read which may be passed to the VNODE layer and issued to bcfs. Bcfs_read reads the bmap from the asset's bmap file, in steps 4-6, by issuing a recursive read through the VNODE layer. BCFS then interprets the bmap to determine the location of the desired data blocks on the Tier 3 storage device. Step 7 represents bcfs issuing the translated read directly to tier 3 storage, and returning the result.

Some considerations in designing BCFS are:
1. Minimizing changes to stable code. By introducing a new file system layer, streaming applications may access the shared hint files and assets without modification.
2. Providing a persistent store for cached block maps and hint files. This may reduce the RAM requirements of the block map cache, enable block maps to persist through system reboots and enables asset block maps to be retained on the video pumps 14 for the life of the assets on Tier 3 storage.

3. Buffer cache coherency between video pumps 14 and content writers 12. Providing shared access to assets using block maps instead of raw metadata may avoid cache coherency issues that could arise if only modes were shared.

4. Timing requirements between video pumps 14 and content writers 12. Changes to hint files should be communicated quickly from the content writer to the video pump when streaming from actively ingesting content Waiting for the hint file data to sync to disk then reading it on the video pump would introduce unacceptable delays.

The FFS file system may be implemented such that it is not a shared file system: for example, it may assume that there is a single server reading or writing mounted storage. Based on this assumption, it may be able to cache inode and indirect block metadata in its buffer cache. There are no mechanisms for synchronizing this cache with other servers when file system metadata changes as a result of writing or deleting asset files. If an asset's metadata is cached in server A and server B writes to the asset thereby changing the metadata, server A will not know about the new metadata. While it is conceptually possible to add buffer cache synchronization to FFS, doing so would complicate and could potentially destabilize the file system component. Propagating block maps avoids the cache coherency problem by publishing the current state of the block maps to all servers. Note that this scheme might not work well in a general purpose shared file system due to the overhead of bmap communication. However, in a video pump complex characterized by: (1) a single writer per asset, (2) assets being written once and streamed many times, and (3) a large asset block size resulting in a compact bmap representation, this approach is quite efficient.

The VFS stack may be established by mounting the BCFS layer on an existing lower layer. For example, mount –t bcfs/ localfs/assets/cache mounts a block cache file system/localfs at a mount point "/assets/cache." All accesses to files in /assets/cache will now pass through the BCFS module to the underlying local file system, which contains copies of the block map and hint files. The blockmap files act as proxies for the remote files on Tier 3 storage. The content syncher process arranges for the local blockmap files to have names that are the same (or optionally with a ".bmap" extension appended) as the names of the actual asset files on Tier 3 storage.

As an example of one VFS implementation, this exemplary VFS implementation would show a listing of assets on the remote storage rather than the local files. This could be an important feature for a general purpose shared file system, but bcfs was designed to specifically address the problem of providing high performance shared access to assets with minimal overhead. Providing distributed directory services could require the bmap files (or a related structure) to have sufficient information to access the metadata describing directory entries and inodes on the shared storage. Propagating this information to the video pumps 14 would require provisions for maintaining cache coherency and locking which would add additional overhead. More importantly, these metadata accesses would contend with streaming accesses for service by the Storage Array 20 and could therefore degrade streaming performance. A burst of reads generated from a simple 1s command could cause disruption in stream delivery. As designed, the only requests made to the Storage Array 20 by a VP during streaming are for the stream data, not for any metadata.

Block Map Definition

Figure 3:
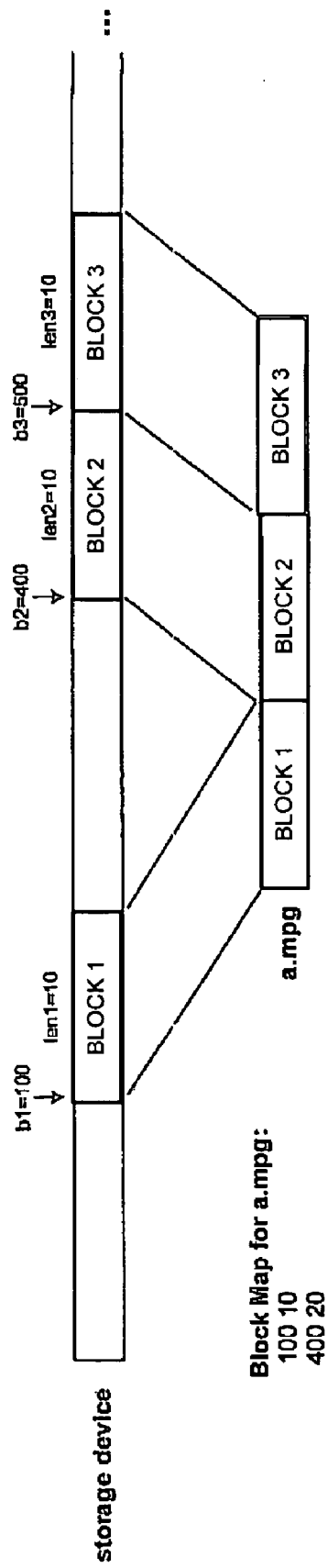
FIG. 3 illustrates an exemplary block map.

This section describes, in an embodiment, what may be implied by the term Block Map or bmap. As shown in FIG. 3, an asset as stored on disk may include a sequence of contiguous sectors called a block. Depending on the file system's block placement policy, blocks may be placed contiguously or distributed in some fashion across the disk's address space.

A block may be completely specified by its logical block address (LBA) and length. A block map then is a sequence of blocks, where an LBA and a length may be used to identify a block.

In order to achieve high levels of throughput from disk drives, blocks should be large to amortize the cost of a seek (moving the disk head to the start of the block) plus latency (waiting for the platter to rotate until the data is under the disk head) over a large data transfer. For the current generation of Fibre Channel disk drives, block sizes in the range 512K to 2 MB may provide 50%-80% of the drives sustainable throughput on contiguous data.

Since a single 32-bit LBA and 16-bit length are sufficient to describe a block on a Fibre Channel device, the ratio of an asset's size to its block map's size may be equal to at most (block size/6):1. To the extent that blocks are placed contiguously by the file system, the block map's size may be additionally reduced.

Based on a 1 MB contiguous block alignment, the ratio between asset size and the block map size will be 167,000:1 and typically much smaller due to FFS placing blocks contiguously where possible. A block map for a 1 GB asset, for example, would be at most 6 KB.

The file system block size is not determined by the Storage Array; rather, it may be determined by the file system running on the video pump. The Storage Array operates in terms of logical block addresses (LBAs), where each block referenced by an LBA is typically 512 bytes (the device's "sector size"). The file system addresses blocks of data in units of file system block size. The maximum file system block size for FFS is 64K. Since this was not large enough to achieve throughput targets, the file system's block placement algorithm may be modified to guarantee that file system blocks would be placed contiguously in multiples of the asset block size. A single asset block size may be used for all assets in a given file system, to avoid issues with fragmentation.

Block Map File Format

This section describes a sample format for a bmap file. The bmap file may include a header followed by the list of block descriptors.

Header

The bmap file header may include a version number and the SCSI Target and LUN ID of the storage device.

| File Offset | Field Description | Field Size |
| --- | --- | --- |
| 0 | Version Number | 4 bytes, LSB first |
| 4 | SCSI Target ID | 2 bytes, LSB first |
| 6 | SCSI LUN | 2 bytes, LSB first |
| 8 | Disk Slice | 2 bytes, LSB first |
| 10 | Disk Partition, 'a' = 0, 'b' = 1, . . . | 2 bytes, LSB first |
| 12 | File System Block Size (e.g. 64K) | 4 bytes, LSB first |
| 16 | Number of Block Descriptors | 4 bytes, LSB first |
| 20 . . . eof | Block Descriptors | 6 bytes* # of block descriptors |

The "disk slice" is a FreeBSD concept similar to a partition that allows a drive to be divided into separate regions or "slices". Slices enable a server to boot multiple operating systems. Each OS resides in a separate slice. Within a slice, multiple partitions may be defined, where each partition corresponds to a logical disk (e.g., "a:", "b:", "c:", . . . ). When formatting Tier 3 storage, one may use a specific defined slice and partition, but put the slice and partition in the bmap header to avoid hard-coding assumptions and to allow for flexibility in Tier 3 storage configurations.

The LUN may be the bmap header because it may be needed by bcfs to identity which Storage Array RAID device to read from. Within a Storage Array RAID device, the blocks that are striped across the physical drives may be collectively presented as one (or more) LUNs to the video pump. Since a video pump may use multiple LUNb, it may be beneficial for the LUN ID in the bmap header to identify which RAID device to read from.

Block Descriptor

A block descriptor defines the location and size of a single contiguous block of data on the disk. A Logical Block Address (LBA) and a length, in multiples of the fs-block size, define the block's location.

| Struck Offset | Field Description | Field Size |
| --- | --- | --- |
| 0 | SCSI Logical Block Address | 4 bytes, LSB first |
| 4 | Block length in fs-blocks (e.g. | 2 bytes, LSB first |

Asset Caching with BCFS

The bmap file may be generated on the content writer 12 at the time an asset is loaded. A content syncher on the video pump 14 ensures that the bmap files in /assets/cache are up to date with respect to the files on the content writer. When a stream is assigned to a video pump, the streaming server process may then open the asset and read from the file as if the asset were stored locally.

When the streaming application makes a VOP_READ read request for the asset's data, bcfs_read then reads the block map and device information from the file and determines the logical block address where the asset's data resides; bcfs_read then issues one or more read requests for the data as needed and returns.

After an asset is removed from a content writer 12, the content syncher on a video pump 14 removes its bmap file in /assets/cache/assetname. At this time, the content syncher also clears the asset from the Tier 2 local disk cache.

Hint File Caching with BCFS

Hint files may contain asset metadata for performing "trick modes" (e.g. fast-forward, rewind). The hint files may be generated on the video pump by software when the asset is loaded onto storage. They contain pointers to particular scenes in the asset.

Hint files may be handled similarly to bmap files. The hint file may be generated on the content writer at the time an asset is loaded. The content syncher on the video pump ensures that the hint files in /assets/cache are up to date with respect to the files on the content writer. When a stream is assigned to a video pump, the Streaming Server can then open the hint file and use it, since it is locally cached.

Alternatively, if the latency requirements for streaming an asset as it is being ingested allow for it, a block map for the hint file may be cached on the video pump. Read requests for the hint file data may be handled by bcfs in the same way as asset reads, as described above.

Tiered Caching

As mentioned above, the video pumps 14 in the multi-server complex may use three tiers of content storage and caching. The purpose of tiered caching may be twofold: first, it decouples streaming bandwidth from asset storage bandwidth. With the addition of the cache, "hot spots" or instances of load imbalance among the arrays may be avoided. Without caching, load imbalance may easily occur due to a disproportionate number of streams being requested from any given storage array due to variations in asset popularity. Second, it reduces cost per stream by taking advantage of the natural variations in asset popularity by serving streams from assets of differing popularities from media types that are the most cost effective. For example, a single highly popular asset may be most cost-effectively served from RAM since the storage requirements are low but the bandwidth requirements are high. A large library of infrequently accessed content may be most cost-effectively served from inexpensive slow hard drives which have high storage capacity but low bandwidth The tiered caching implementation dynamically and automatically serves assets from the most cost (effective type of media based on the asset's popularity at the current time.

Tier 1 of the system may include local RAM, from which a relatively small number of the most popular assets may be served. Tier 2 may include a larger local disk cache that stores the most recently streamed assets in their entirety. The Tier 2 cache may be raw block-level storage with no replication and no file system. Both Tier 1 and Tier 2 are "store and forward" type caches. Tier 3 makes up the large, long-term storage with moderate streaming capacity, which must be roughly equal to the maximum number of unique streams being requested at any time.

FIGS. 4 and 5 show how stream delivery may be distributed across the three tiers of caching. By intelligently selecting video pumps 14 for stream delivery, the resource controller 10 will approximate this distribution of streams across the cache tiers attached to one or more server(s). The resource controller 10 may be used to ensure that Tier 2 disk cache bandwidth limits are not exceeded by distributing streams across video pumps 14, such that each video pump is serving a balanced mix of cacheable and non-cacheable assets. The resource controller 10 monitors one or more video pumps 14, and the current characteristics of their associated viewer streams, so that it can decide which video pump will be assigned a new viewer stream associated with a particular asset. In this way, the bandwidth resources of the complex are globally optimized.

In FIG. 4, $u_3$ is the number of assets read from Tier 3 storage for which there is exactly one stream. For these asset reads, the number of streams $n_3$ equals the number of assets read from Tier 3. $u_2+u_1$ represents the number of assets read from Tier 3 storage for which there is more than one stream. For these streams, the Tier 2 cache acts like a bandwidth amplifier, in the sense that for each asset read going into the Tier 2 cache, a multiple number of viewer streams come out. The number $n_2+n_3$ represents the total number of streams coming out of Tier 2 cache with multiple viewers. $n_2$ is the number of viewer streams that come directly out of Tier 2 cache, and do not pass into Tier 1 cache. The viewer streams coming out of Tier 2 cache are not synchronous in time with respect to the asset reads going into the Tier 2 cache, or other viewer streams of the same asset, since the cache time shifts each of the viewer streams. The Tier 1 caching algorithm chooses a subset $u_1$ of the $u_2+u_1$ streams that are highly cacheable and directs these streams into the Tier 1 RAM cache. As with the Tier 2 cache, for the Tier 1 cache, a stream that is cached at the Tier 1 level, several streams come out. The number $n_1$ is the total number of streams coming out of the Tier 1 cache that do not use any additional I/O bandwidth from Tier 2 or Tier 3 storage. The total number of streams provided by the server may be $n_1+n_2+n_3$. The total bandwidth required from Tier 3 storage may be $u_1+u_2+u_3$. FIG. 5 relates these parameters to typical values for an IP2160 video pump as predicted by a zipfian asset popularity distribution that has been correlated to video popularity, as disclosed by M. Bar, et al., "Long-term Movie Popularity Models in Video-on-Demand Systems," Proceedings of ACM Multimedia Conference, pp. 349-357, November 1997, hereby incorporated by reference.

In addition to the Tier 2 Local Disk cache amplification effect, there is the potential that an asset read from Tier 3 storage will not be required because it was previously read and still resides in the Tier 2 cache. How often this happens may be determined by the ratio of the total Tier 2 cache size to the total Tier 3 storage size. This ratio may be termed the Disk Cache Hit Ratio (DHCR).

Tier 1 RAM Cache

This section outlines one possible implementation of a Tier 1 RAM caching algorithm. This algorithm is described here to illustrate how the Tier 1 cache can operate in conjunction with the other cache tiers to support a scalable server complex.

Interval caching may be a buffer management policy that identifies segments of temporally related streams that can be efficiently cached to increase server throughput. The algorithm is described in A. Dan, et al., "Buffer Management Policy for an On-Demand video server," in IBM Research Report RC 19347, hereby incorporated by reference. The algorithm's performance with respect to reducing server cost is examined in A. Dan, et al., "Buffering and Caching in Large-scale video servers," in Proc. Compcon, pp. 217-224, March 1995, hereby incorporated by reference. An interval may be defined as a pair of consecutive stream requests on the same asset that overlap in time. Interval caching allows the following stream in a pair to be served from cache, with an instantaneous cache requirement equal to the size of the data represented by the offset in stream start times. If the stream starts are closely spaced, the savings can be significant. The interval-caching algorithm exploits this by maintaining a sorted list of all intervals and allocating cache to the set of intervals with the smallest cache requirement.

FIG. 6 shows a interval-caching example. Stream A may be requested from the server at time 0. At some later time, prior to the completion of stream A, stream B may be requested. Since stream A and B are playing the same asset, an interval may be formed. The amount of data represented by the overlap A may be calculated and the interval may be inserted into the sorted list of intervals. Since there may be sufficient cache memory for the interval, it may be allocated to the interval and the shaded portion of stream B may be served entirely from cache.

When compared to static asset replication, interval caching makes more effective use of cache memory and no a priori knowledge of asset popularity or manual asset replication is required. Streams in a trick mode do not participate in Tier 1 caching due to the changing interval relationships invoked by the trick mode, but they can still benefit from Tier 1 cache hits if the requested data happens to be in Tier 1 cache.

Tier 2 Local Disk Cache

The purpose of the Tier 2 cache may be to decouple streaming bandwidth from asset storage bandwidth by caching all of the assets as they are being read from external storage 20 in their entirety. It may include a large local drive array that may be managed as raw block-level storage with no replication and no file system. It may be a "store and forward" type of cache, meaning that the cache contents are written as the blocks are read and the store operation does not impact the flow of data from external storage. In the IP2160 Media Server (Midstream Technologies), for example, the Tier 2 cache resides on a portion of the internal drive array.

The Tier 2 Local Disk Cache may be similar in structure to Tier 1 Interval Cache. When the video pump issues a read on a stream that is being cached, i.e., the stream is being requested from external storage, the block may be copied to an allocated block in the Tier 2 cache and a hash table entry may be created that maps the file's block on disk to the cache block. Before the video pump issues a read, it may check the hash table to see if the block resides on local disk cache. If so, the blocks are read from the cache block instead of from the Tier 3 disk device.

Resource Controller Operation

When choosing a video pump 14 to handle the stream service request, the resource controller 10 may look for a server that is most likely to already have the asset in cache, but may direct the request to another server in the complex to make optimal use of the complex's resources. For example, suppose a single, highly popular asset is served from one video pump's Tier 1 RAM cache, and the number of viewer streams requesting this asset saturates the bandwidth streaming capacity of the video pump. In this case, the video pump will not be utilizing Tier 3 external storage interface or internal Tier 2 disk drives, resulting in a higher percentage of the global stream load emitted from these Tiers to be placed on the other video pumps 14 in the complex. Since the Tier 2 local cache disk bandwidth on a video pump may be limited, the resulting increase in cached streams on the other video pumps 14 may exceed their Tier 2 disk bandwidth, effectively limiting the number of streams that the complex can support. To maximize the throughput of the complex as a whole, a balanced mix of cacheable and non-cacheable assets must be maintained on each video pump, in proportions similar to that depicted in FIG. 5.

One relatively simple algorithm used by the resource controller 10 may effectively maintain this balance. In order to minimize communications between the resource controller and the video pumps 14 that describe the dynamic cache state of each video pump, and to avoid having to store such information, the resource controller 10 stores a table with one entry per requested asset that indicates which video pump served a viewer stream from the asset. Since caches are most effective on streams that are closely spaced in time, directing new streams to the video pump 14 that last served an asset makes effective use of the caches. Additionally, the resource controller maintains a count of the number of streams currently active on each video pump. If this count exceeds a set threshold, the stream will be directed to the video pump with the least streaming bandwidth load. This mechanism ensures that highly popular assets get shared across video pumps 14, with no single video pump handling too many streams on any given highly popular asset. It also distributes the streaming load across video pumps 14.

In summary, an illustrative implementation of the stream load balancing algorithm may include the following steps:
1. A stream request arrives at resource controller 10.
2. The resource controller 10 determines which video pump 14 served the asset last.
3. If no video pump 14 is serving the asset, the resource controller 10 directs the request to a video pump with the most available streaming bandwidth.
4. Else, if a video pump 14 is found, the resource controller 10 checks that the current active count for this asset on the video pump is less than a predefined threshold.
   a. If the threshold is not exceeded, the resource controller 10 directs the request to the last video pump; or
   b. If the threshold is exceeded, the resource controller 10 directs the request to a video pump with the most available streaming bandwidth.

CONSLUSION

The claims are not limited to the illustrative embodiments disclosed herein. For example, the foregoing disclosure of a distributed storage architecture based on block map caching and VFS stackable file system modules, as well as a scalable streaming video server complex based on tiered caching, uses explanatory terms, such as content writer, video pump, controller, and the like, which should not be construed so as to limit the scope of protection of this application, or to otherwise imply that the inventive aspects of the systems, devices and methods described herein are limited to the particular methods and apparatus disclosed. Moreover, as will be understood by those skilled in the art, many of the inventive aspects disclosed herein may be applied in computer systems that are not employed for streaming media or video-on-demand purposes. Similarly, the invention is not limited to systems employing VFS stackable file system modules and/or block maps as described above, or to systems employing specific types of computers, processors, switches, storage devices, memory, algorithms, etc. The content writers, video pumps, resource controller, etc., are essentially programmable computers that could take a variety of forms without departing from the inventive concepts disclosed herein. Given the rapidly declining cost of digital processing, networking and storage functions, it is easily possible, for example, to transfer the processing and storage for a particular function from one of the functional elements described herein to another functional element without changing the inventive operations of the system. In many cases, the place of implementation (i.e., the functional element) described herein is merely a designer's preference and not a hard requirement. Accordingly, except as they may be expressly so limited, the scope of protection is not intended to be limited to the specific embodiments described above.

We claim:

1. A distributed storage system for streaming data, said system comprising:
    a first content writer configured to write an asset file to a first storage device, write a first block map for said asset file to the first storage device, said first block map comprising information concerning boundaries where said asset file is stored on said first storage device, write a first file associated with said asset file to the first storage device, said first file comprising at least one pointer to a location in said asset file, and write a second block map for said first file to the first storage device, said second block map comprising information concerning boundaries where said first file is stored on said first storage device;
    a program configured to write a copy of said first block map and said second block map on a second storage device coupled to a first video pump, wherein said first video pump is also coupled to said first storage device;
    a content syncher process configured to arrange for said copies of said first block map and said second block map on the second storage device to have names that are correlated with the names of the corresponding asset file and first file on the first storage device;
    a virtual file system configured to enable said first video pump to read said asset file by using said copy of said first block map, said virtual file system further configured to enable said first video pump to read said first file by using said copy of said second block map, said virtual file system further comprising a stackable virtual node interface and at least one virtual node; and
    a resource controller configured to:
        receive a request for said asset file, and
        select said first video pump from among a plurality of video pumps and direct the request to said first video pump;
    wherein said resource controller is further configured to determine that said first video pump has streamed said asset file more recently than any other video pump from among said plurality of video pumps and select said first video pump based upon said determining.

2. The distributed storage system of claim 1 wherein said resource controller is further configured to monitor said plurality of video pumps and select said first video pump based upon said monitoring.

3. The distributed storage system of claim 1 wherein said first storage device comprises a local file system configured to employ a block placement algorithm to write multiple local file system blocks contiguously when said first content writer writes said asset file.

4. The distributed storage system of claim 1, further comprising a switch configured to provide concurrent, non-blocking access between the first content writer, the first video pump, and the first storage device.

5. The distributed storage system of claim 1 wherein said first storage device is configured to provide a third tier storage mechanism, and said first video pump comprises first and second tier storage mechanisms.

6. The distributed storage system of claim 5 wherein said first tier storage mechanism comprises random access memory (RAM) and said second tier storage mechanism comprises disk storage.

7. The distributed storage system of claim 1 wherein said first storage device is configured to provide a third tier storage mechanism, said second storage device provides a second tier storage mechanism, and said first video pump comprises a first tier storage mechanism, wherein said first tier storage mechanism comprises random access memory (RAM) and said second tier storage mechanism comprises disk storage.

8. The distributed storage system of claim 1, further comprising a switch configured to provide concurrent, non-blocking access between the first content writer, the first video pump, and the first storage device.

9. A tangible computer readable storage medium having stored thereon computer-executable instructions that, if executed by a computing device, cause the computing device to perform a method comprising:
    writing an asset file comprising a plurality of data blocks to a first file system;
    writing a first block map file for said asset file to said first file system, said first block map file comprising information concerning boundaries where said asset file is stored on said first file system;
    writing a first file associated with said asset file to said first file system, said first file comprising at least one pointer to a location in said asset file;
    writing a second block map file for said first file to said first file system, said second block map file comprising information concerning boundaries where said first file is stored on said first file system;
    writing a copy of said first block map file and said second block map file to a second file system accessible by a first video pump, wherein said first file system is also accessible by said first video pump, and wherein a content syncher process is configured to arrange for said copies of said first block map file and said second block map file on said second file system to have names that are correlated with the names of the corresponding asset file and first file on said first file system; and operating a virtual file system that enables said first video pump to read said asset file by using said copy of said first block map file, said virtual file system further enables said first video pump to read said first file by using said copy of said second block map file, said virtual file system comprising:

a stackable vnode interface, a first vnode, representing said asset file using said copy of said first block map file stored on said second file system used by the first video pump, and a second vnode, representing said first file using said copy of said second block map file stored on said second file system used by the first video pump, wherein a resource controller monitors the first video pump, receives a request for the asset file, selects the first video pump from among a plurality of video pumps based upon the monitoring, and directs the request to the first video pump.

10. The computer readable storage medium of claim 9 wherein said first block map file includes a block descriptor comprising a logical block address and a block length including a count of contiguous sectors.

11. The computer readable storage medium of claim 10 wherein said block descriptor represents a logical storage location containing a data block of said asset file.

12. The computer readable storage medium of claim 10 wherein said first block map file further includes a header comprising parameters of the storage device.

13. The computer readable storage medium of claim 12 wherein the parameters include a small computer system interface (SCSI) target identifier.

14. The computer readable storage medium of claim 12 wherein the parameters include a small computer system interface (SCSI) logical unit number.

15. The computer readable storage medium of claim 12 wherein the parameters include a disk slice.

16. The computer readable storage medium of claim 12 wherein the parameters include a block size of the first file system.

17. The computer readable storage medium of claim 12 wherein the parameters include a count of block descriptors in the block map file.

18. The computer readable storage medium of claim 9 wherein a size of said data block is a multiple of a block size of said first file system.

19. The computer readable storage medium of claim 9 wherein said first block map file is created by a process when said asset file is stored on said first file system.

20. The computer readable storage medium of claim 19 wherein said process is executable on said computing device.

21. The computer readable storage medium of claim 9 wherein types of said first and second file systems are the same.

22. A method of reading data from an asset file stored on a first storage device, said method comprising:

writing a first block map for said asset file to said first storage device, wherein said first block map comprises information concerning boundaries where said asset file is stored on said first storage device;

writing a first file associated with said asset file to said first storage device, said first file comprising at least one pointer to a location in said asset file;

writing a second block map for said first file to said first storage device, said second block map comprising information concerning boundaries where said first file is stored on said first storage device;

writing a copy of said first block map and a copy of said second block map to a second storage device coupled to a first video pump, wherein said first video pump is also coupled to said first storage device, and wherein a content syncher process is configured to arrange for said copies of said first block map and said second block map on said second storage device to have names that are correlated with the names of the corresponding asset file and first file on said first storage device;

receiving a request for data from said asset file;

selecting, said first video pump from among a plurality of video pumps;

directing said request to said first video pump;

issuing a system call at said first video pump to read said asset file and said first file using a virtual file system, wherein said virtual file system is configured to enable said first video pump to read said asset file using said copy of said first block map, wherein said virtual file system is further configured to enable said first video pump to read said first file using said copy of said second block map, said virtual file system comprising a stackable virtual node interface and at least one virtual node;

retrieving, at said video pump, a logical block address associated with the data;

reading the data at said video pump from the first storage device using the associated logical block address; and determining that said first video pump has transmitted data from said asset file more recently than any other video pump in a plurality of video pumps, and selecting said first video pump from among said plurality of video pumps based on said determining.

23. The method of claim 22, further comprising creating said first block map when said asset file is stored on said first storage device.

24. The method of claim 22, further comprising writing said second block map when said first file is stored on said first storage device.

25. The method of claim 22 further comprising monitoring a plurality of video pumps and selecting said first video pump from among said plurality of video pumps based on said monitoring.

26. The method of claim 22 wherein said first block map comprises a first list of logical block addresses, and wherein at least one logical block address in the first list identifies a sector used to store data in said asset file.

27. The method of claim 26, wherein the list further comprises a block length associated with each logical block address, and wherein said block length represents a count of contiguous sectors succeeding the identified sector, further comprising retrieving an associated block length and wherein the data block is contained in a logical storage area identified by the retrieved logical block address and the associated block length.

28. A tangible computer readable storage medium having stored thereon computer-executable instructions that, if executed by a computing device, cause the computing device to perform a method comprising:

writing a first block map for an asset file to a first file system, wherein said first block map comprises information concerning boundaries where said asset file is stored on said first file system;

writing a first file associated with said asset file to said first file system, said first file comprising at least one pointer to a location in said asset file;

writing a second block map for said first file to said first file system, wherein said second block map comprises information concerning boundaries where said first file is stored on said first file system;

writing a copy of said first block map and a copy of said second block map to a second file system accessible by a first video pump, wherein said first file system is also accessible by said first video pump, and wherein a content syncher process is configured to arrange for said copies of said first block map and said second block map on said second file system to have names that are correlated with the names of the corresponding asset file and first file on said first file system;

receiving a request for data from said asset file;

selecting, said first video pump from among a plurality of video pumps;

directing said request to said first video pump;

issuing a system call at said first video pump to read said asset file and said first file using a virtual file system, wherein said virtual file system is configured to enable said first video pump to read said asset file using said copy of said first block map, and wherein said virtual file system is configured to enable said first video pump to read said first file using said copy of said second block map, said virtual file system comprising a stackable virtual node interface and at least one virtual node;

retrieving, at said first video pump, a logical block address associated with the data;

reading at said first video pump data from said first file system using the associated logical block address; and monitoring said plurality of video pumps and selecting said first video pump based on said monitoring.

29. The computer readable storage medium of claim 28, further comprising computer-executable instructions for creating said first block map when said asset file is stored in said first file system.

30. The computer readable storage medium of claim 28, further comprising computer-executable instructions for creating said first file when said asset file is stored in said first file system.

31. The computer readable storage medium of claim 28, wherein said first block map comprises a first list of logical block addresses, wherein at least one logical block address in the first list identifies a sector used to store data in said asset file, wherein the first list further comprises a block length associated with each logical block address, and wherein said block length represents a count of contiguous sectors succeeding the identified sector.

32. The computer readable storage medium of claim 31, further comprising computer-executable instructions for retrieving an associated block length and wherein the data block is contained in a logical storage area identified by the retrieved logical block address and the associated block length.

33. A tiered caching system, comprising:
a first cache memory configured to store a digital asset, a first block map for said digital asset, a first file for said digital asset, and a second block map for said first file, said first file comprising at least one pointer to a location in said digital asset, said first block map comprising information concerning boundaries where said digital asset is stored in said third tier cache memory, said second block map comprising information concerning boundaries where said first file is stored in said third tier cache memory;

a second cache memory configured to store a copy of said first block map and said second block map;

a content syncher configured to arrange for said copies of said first block map and said second block map in the second cache memory to have names that are correlated with the names of the corresponding digital asset and first file in said first cache memory;

a plurality of video pumps coupled to said first cache memory and said second cache memory;

a virtual file system configured to enable said plurality of video pumps to read said digital asset in said first cache memory using said copy of said first block map, said virtual file system further configured to enable said plurality of video pumps to read said first file on said first cache memory using said copy of said second block map, said file system further comprising a stackable virtual node interface and at least one virtual node; and a controller configured to select a first video pump from among the plurality of video pumps and direct said request to said first video pump;

wherein the controller is further configured to select the video pump from among the plurality of video pumps by:

determining that said first video pump began emitting a stream of said digital asset more recently than any other video pump from among said plurality of video pumps; and selecting said first video pump from among said plurality of video pumps based on said determining.

34. The tiered caching system of claim 33 wherein said first cache memory comprises disk storage.

35. The tiered caching system of claim 33 wherein said first cache memory comprises an array of disks.

36. The tiered caching system of claim 33 wherein said second cache memory comprises disk storage.

37. The tiered caching system of claim 33 wherein said second cache memory comprises random access memory (RAM).

* * * * *

UNITED STATES PATENT AND TRADEMARK OFFICE
CERTIFICATE OF CORRECTION

PATENT NO. : 7,640,274 B2 Page 1 of 1
APPLICATION NO. : 11/186300
DATED : December 29, 2009
INVENTOR(S) : Tinker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 729 days.

Signed and Sealed this

Twenty-first Day of December, 2010

David J. Kappos
*Director of the United States Patent and Trademark Office*